(12) United States Patent
Goodman et al.

(10) Patent No.: US 7,702,091 B1
(45) Date of Patent: Apr. 20, 2010

(54) METHODS AND APPARATUS FOR INTEROPERATING COMMUNICATION NETWORKS

(75) Inventors: William D. Goodman, Collegeville, PA (US); Douglas R. Jones, Medford, NJ (US)

(73) Assignee: Verizon Services Corp., Arlington, VA (US)

( * ) Notice: Subject to any disclaimer, the term of this patent is extended or adjusted under 35 U.S.C. 154(b) by 1320 days.

(21) Appl. No.: 10/316,426

(22) Filed: Dec. 11, 2002

(51) Int. Cl.
*H04L 12/28* (2006.01)
*H04J 3/16* (2006.01)
*H04M 7/00* (2006.01)
*H04M 1/24* (2006.01)

(52) U.S. Cl. .............. 379/221.09; 379/15.03; 370/401; 370/465

(58) Field of Classification Search ............ 379/210.02, 379/201.11, 88.23, 88.01, 93.01, 93.04, 219, 379/230, 90.01, 93.09, 100.15, 142.07, 211.02; 370/352, 390, 389, 401, 400, 356, 351, 230; 455/500, 503
See application file for complete search history.

(56) References Cited

U.S. PATENT DOCUMENTS

| | | | | |
|---|---|---|---|---|
| 6,078,584 A * | 6/2000 | Mottishaw et al. | ......... | 370/385 |
| 6,085,101 A * | 7/2000 | Jain et al. | ................ | 455/500 |
| 6,668,049 B1 * | 12/2003 | Koch et al. | ............ | 379/211.02 |
| 6,876,632 B1 * | 4/2005 | Takeda | ................ | 370/259 |
| 6,993,119 B1 * | 1/2006 | Zhang et al. | ............ | 379/88.01 |
| 7,010,113 B2 * | 3/2006 | Moss et al. | ............ | 379/210.02 |
| 7,023,837 B1 * | 4/2006 | Srinivasan | ............ | 370/352 |
| 7,035,385 B2 * | 4/2006 | Levine et al. | ............ | 379/88.23 |
| 7,054,939 B2 * | 5/2006 | Koch et al. | ............ | 709/227 |
| 7,274,783 B2 * | 9/2007 | Yoakum et al. | ............ | 379/219 |
| 7,286,659 B2 * | 10/2007 | Crockett et al. | ....... | 379/210.02 |

* cited by examiner

*Primary Examiner*—Hanh Nguyen (57) ABSTRACT

PSTN functionality is enhanced by the addition of an external service bridging device (ESBD) between one or more devices, e.g., signal switching points (SSPs), and a service control point (SCP). The ESBD serves as a coupling device to one or more control devices, e.g., other SCPs or IP servers, in addition to the SCP. To support the passing of messages between the SS7 network and the control devices, the ESBD includes message reformatting capabilities. The ESBD monitors for messages directed to SCPs and/or replies to messages directed to an SCP. In response to detecting a message the ESBD checks to determine if the detected message is to be processed or simply forwarded to the SCP. Messages to be processed are intercepted, duplicated, modified, replaced, broadcast, redirected, etc. Replies to broadcast query messages are detected and processed so that a single reply, in the format of an SCP response, is returned.

24 Claims, 3 Drawing Sheets

METHODS AND APPARATUS FOR INTEROPERATING COMMUNICATION NETWORKS

FIELD OF THE INVENTION

The present invention is directed to communication networks, and more particularly, to methods and apparatus for adding functionality and/or network interoperability features to a communications network such as, e.g., the public switched telephone network (PSTN).

BACKGROUND OF THE INVENTION

When networks for communications are created, they are usually designed for use with existing standards and protocols in mind. Significant investment may have been made to deploy an existing network. Accordingly, it is often commercially impractical to replace an entire network or large portions of an existing network that remains operational. The existing telephone network, also known as the PSTN, is an example of an existing functional network that remains functional, is large, and represents a huge investment in equipment. Unfortunately, in many situations desired enhancements to existing networks, e.g., the PSTN, such as some multicast services or web based services utilize resources that are beyond the capabilities of the network as it was originally designed. It would be desirable if a way could be found to add new functionality to the PSTN without requiring major modifications to the existing network and/or previously deployed equipment.

As new generations of service control technologies are becoming available, resulting in non-SS7 (non-Signaling System 7) based networks, many based on computer industry and Internet standards, interoperation and integration with established SS7 networks such as the PSTN is a significant problem which needs to be addressed.

Two commonly discussed methods of accessing these next generation control platforms from within the PSTN include 1) enhancements to PSTN control platforms, e.g., upgrades to service control points (SCPs), and 2) gateways to new SS7 domains, e.g., IP feature server behind a gateway that acts as an SS7 Service Switching Point (SSP). Each of these methods require significant new investment in the PSTN such as upgrading SCP systems, along with ongoing administrative costs such as provisioning new point codes and updating routing tables. Both methods are also limited in their utility, as they will normally be limited to acting on requests that are specifically made to an external control platform. Given the shortcomings of the above techniques, there is a need for additional network integration approaches that can provide greater flexibility and thereby allow for new services or better execution of existing services in addition to supporting interoperation of different networks.

In addition to a need to support network interoperability, there is a need for improved methods of supporting SCP load balancing to reduce the need to replace or upgrade existing SCPs as new services and/or more customers subscribe to advanced services in a given service region. Existing telephone services can be negatively affected when an SCP that provides advanced telephone services is used to capacity. Without load sharing, overloading of an SCP may occur while other SCPs that can provide the same services are under utilized, e.g., because of differences in regional customer demographics. There is a desire to alleviate this type of network congestion to provide better service to customers and to optimize the use of already deployed hardware.

From the above discussion it is apparent that there is a need to link the existing legacy (PSTN/SS7 network) with new external control platforms, e.g., IP based systems, existing in non-SS7 domains, to allow new services and/or enhanced services to be provided to PSTN users. The links to the new control platforms should, preferably, be performed in a manner that allows such external control platforms to interact with PSTN elements in a relatively transparent manner that does not require major modifications to existing PSTN elements. If this can be achieved, large additional investments in PSTN/SS7 upgrades and/or administration costs can be reduced or avoided while still allowing for new or enhanced services.

In view of the above discussion, it is apparent that there is a need for new methods of supporting PSTN system interoperability with non-SS7 based systems or networks, a need for a method of providing new services without requiring significant changes to already deployed SCPs and SSPs, and for improving SCP load balancing.

SUMMARY OF THE INVENTION

The present invention is directed to methods and apparatus for adding functionality and/or network interoperability features to a communications network such as, e.g., the public switched telephone network (PSTN). In accordance with the present invention, an external service bridging device (ESBD) is inserted to into a communications network on a link to monitor for messages sent to a service control point and/or replies to query messages sent to a service control point. The monitored communications link may be an SS7 link positioned between one or more signal switching points (SSPs) and a service control point (SCP).

The ESBD may be inserted in a conventional SS7 network at a point, e.g., link, used to couple conventional SSPs to a conventional SCP. Thus, the ESBD of the present invention may be used in the existing PSTN without requiring hardware modifications to already deployed SSPs and SCPs. The ESBD is coupled to one or more control devices in addition to the SCP. The control devices may be additional SCPs, intelligent peripheral devices (IPs), or Internet Protocol (IP) servers which provide advanced functionality and/or, in some cases, services not available from a conventional SCP. To support the passing of messages between the SS7 network and the additional control devices, the ESBD includes the capability to reformat messages to/from various formats such as IP packets and an SS7 format, e.g., TCAP message format. Reformatting of messages may involve, e.g., reordering message fields and/or the data included in a field. The ESBD may also perform protocol conversion operations. While reformatting may be part of a protocol conversion operation, protocol conversion may involve the introduction of entirely new fields as opposed to simply reformatting/reordering of existing fields.

The ESBD may be implemented as a pass through device with the ability to detect and intercept query messages from a SSP and reply messages directed to a SSP. In some embodiments, only the return links are implemented as pass-through devices with the ESBD being coupled, in parallel, to the link from the SSP to the SCP. In such a case, reply messages may be intercepted while query messages will proceed to the SCP whether or not they trigger an additional processing action by the ESBD.

The ESBD of the present invention monitors for messages directed to SCPs, e.g., TCAP messages which represent queries for call processing instructions.

Detected messages directed to an SCP or which are in response to a message directed to an SCP are intercepted, duplicated, modified, replaced, broadcast, redirected and/or otherwise processed as desired or necessary, e.g., to support interoperability with, and services provided by one or more control devices other than the SCP to which the message is directed or the message which initiated the detected reply message was directed.

In the case of redirecting a message, the original query message may be directed to an SCP other than the normal SCP. This may be done for load balancing or other purposes. Alternatively, the detected message may be reformatted and sent to an advanced control device such as an IP based server. When a redirect operation is implemented by the ESBD of the invention, the original message will not be sent to the SCP to which the query message was originally directed. The reply from the device to which the message is redirected will be detected by the ESBD and reformatted as necessary to make it appear as if from the SCP to which the message was originally directed. The reply message is then sent to the device from which the original query message originated which then responds as if the message was from the SCP to which it was originally directed. Thus, loading of the existing SCP can be reduced and/or new functionality can be added without having to make hardware modifications to the existing SCP and/or SSP.

Multicasting is another option which is supported by the ESBD of the present invention. In the case of multicasting, a detected query message may trigger the ESBD to transmit query messages to multiple control devices. The original detected TCAP message may also be sent to the SCP to which it was originally directed. The ESBD monitors for replies to the multicast query message and selects one reply to be returned to the SCP. In various embodiments, the reply from the SCP to which the query message was originally directed is used as the default selection when replies are not received from one or more advanced control devices. Since a single reply, in the proper format, is returned to the requesting device, the SSP and SCP are shielded from the complexity associated with a multicast operation and act in a conventional manner in generating and responding to TCAP messages. Defaulting to the reply from the conventional SCP is useful in cases where the advanced control devices, e.g., IP servers, only control call processing when the user is logged into one of the IP servers.

In addition to performing redirection and multicasting the ESBD of the present invention can be used to modify query messages prior to the messages being forwarded to the SCP or modify replies received from an SCP without changing the recipient. Such modification of messages is useful where a different individual with different AIN services may be temporarily using another individual's telephone but would like to receive one or more of the features to which the different individual subscribes.

The ESBD of the present invention allows for monitoring of any or all SS7 messages on an SS7 link to provide added functionality that may not be possible with other proposed techniques for interoperating two control platforms. This allows the ESBD to provide service enhancements to already established telephone service. Such enhancements include, e.g., redirecting traffic at heavily used network elements or acting as a proxy for some telephone services. Since the ESBD operates in a manner that is relatively or completely transparent to existing PSTN elements, the ESBD provides a convenient way to upgrade and/or add additional features to the existing PSTN without requiring major changes to already deployed SS7 equipment.

Numerous additional features, benefits and details of the methods and apparatus of the present invention are described in the detailed description which follows.

DETAILED DESCRIPTION

Figure 1:
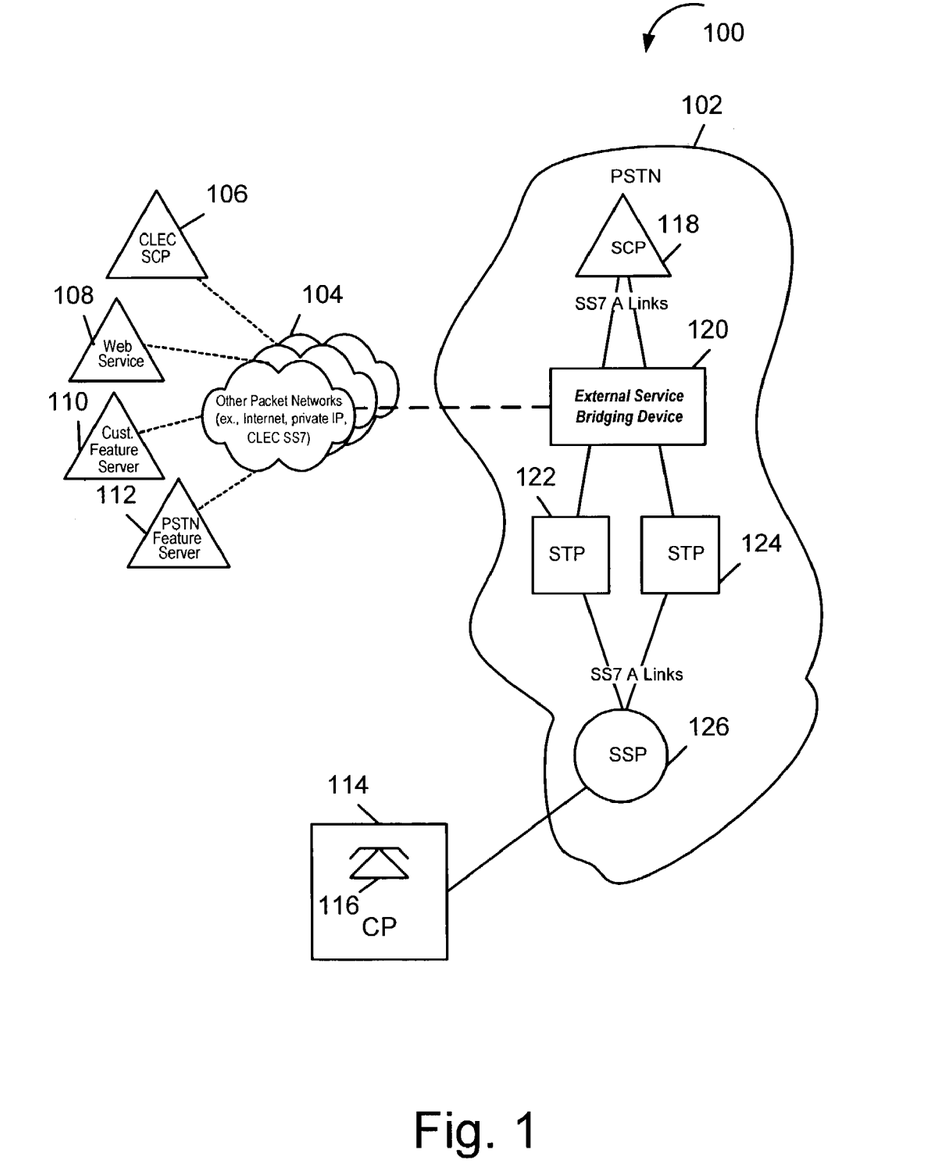
FIG. 1 illustrates a communications system implemented in accordance with the present invention.

FIG. 1 illustrates a communications system 100 implemented in accordance with the present invention. The system 100 includes a public switched telephone network (PSTN) 102, a customer premise 114, various other external service networks 104, 104', 104" and some exemplary external control devices such as servers 108, 110, 112 and an SCP, e.g., a competitive local exchange carrier (CLEC) SCP 106. Sever 108 is a Web based services server which provides Internet services, server 110 is a customer feature server 110 which provides various features to subscribes, while server 112 is a PSTN feature server which is designed to provide enhanced PSTN serves to customers, some of which may involve the use of IP connections and/or information received via an IP based network. These devices 106, 108, 110, 112 are coupled to the PSTN 102 via their corresponding external service networks 104, 104', 104" and serve as external control platforms that provide services, e.g., enhanced services, to the users of the PSTN 102. The provided services can be services which are not offered in the PSTN/SS7 environment or services which are offered but that are being provided by a provider other than the user's local telephone company. In some cases the SCP 106 coupled to the PSTN may be operated by the local telephone company which provides use of the SCP 106 to a competitor for a charge while also using the SCP 106, in accordance with the invention, for load balancing purposes. Some of the servers, e.g., web based services server 108, use a different protocol from SS7, i.e., TCP/IP (Transmission Control Protocol/Internet Protocol), to communicate data. Therefore, different addressing and routing schemes are used, and a packet of data formatted for the PSTN's SS7 network cannot be delivered directly on such a non-SS7 network without reformatting and/or other processing.

PSTN 102 includes one or more signal switching points (SSPs) 126, a Service Control Point (SCP) 118, Signal Transfer Points (STPs) 122, 124, and an External Service Bridging Device (ESBD) 120 which are coupled together using SS7 links. In accordance with the present invention, the ESBD 120 is positioned so that it can monitor and/or intercept communications between STPs 122, 124 and the SCP 118. As will be discussed below, this allows the ESBD 120 to support network interoperability, provision of enhanced services, and SCP load balancing in a manner that can be relatively transparent to the STPs 122, 124, the ssP 126 and the SCP 118. STPs 122, 124, SCP 118 and SSP 126 may be implemented as conventional PSTN components. In fact, they may correspond to previously deployed PSTN components. The SSP 126, as is known in the art, may be implemented using known Class 4 and/or Class 5 telecommunications switches, e.g., telephone switches, capable of supporting the SS7 protocol. For purposes of simplification only one SSP 126 is shown in FIG. 1. Trunk lines, which may comprise, e.g., one or more T1 lines, interconnect the various SSPs included in the PSTN 102.

The system 100 is implemented using advanced intelligent network (AIN) techniques. Accordingly, the processing of calls directed to a customer's telephone line and/or received by a SSP from a telephone customer's line may encounter AIN triggers set at a SSP. In response to the AIN trigger, call processing is controlled by instructions included in customer call processing records (CPRs) stored in the SCP 118. The instructions implement the services or part of the services to which the customer subscribes. In accordance with the present invention, services can also be provided by any of the devices 106, 108, 110, 112 coupled to the SCP 126 in response to activation of an AIN trigger.

In system 100, CPRs are stored at a Services Control Point (SCP) 118. Additional CPRs may be stored in CLEC 106. Updates to customer service information and setting triggers at SSP 126 maybe controlled by various components of the SCP 118. The SSP 126 is coupled to the SCP 118, via one or more signal transfer points (STPs) 122, 124. The STPs 122, 124 use Signaling System Seven (SS7) links, e.g., interconnects, to transmit messages, data, and requests for call processing control instructions in accordance with the SS7 protocol and to receive call processing information, e.g., relies including call handling instructions, from the SCP 118. An example of a transmitted message includes a Transaction Capabilities Application Part (TCAP) query, which is transmitted by the SSP 126 in response to an internal AIN trigger being hit, e.g., a trigger event being satisfied by an incoming or outgoing call.

In addition to storing CPRs, the SCP 118 normally includes a list of the services to which the customers serviced by the SCP subscribe. The exemplary SCP 118 supports several telephone services, e.g., a call forwarding service and a call screening service. New generations of telephone services and/or other advanced communications services may utilize functions that are beyond the scope of SCPs as currently implemented in the existing PSTN. To support such services the system 100 includes the ESBD 120 in accordance with the present invention. The ESBD 120 is used to transparently support external control platforms without requiring hardware modifications to existing SCPs, STPs, and/or SSPs. The ESBD 120 is placed between the STPs 122, 124 and the SCP 118 so that SS7 signals, e.g., TCAP messages and SCP replies, going to and from the SCP 118, can be monitored, intercepted, duplicated, modified, replaced, broadcast, redirected and/or otherwise processed as desired or necessary, e.g., to support interoperability with, and services provided by, external devices 106, 108, 110, 112.

Customer premise (CP) 114, which may be, e.g., a residence and/or office, is coupled to the PSTN 102 via SSP 126. Connections between the SSP 126 and CP 114 may be by POTS lines, ISDN lines, DSL, or other known communications lines. The CP 114 includes a communications device 116, e.g., a telephone, which is used by a customer to obtain communications services via the PSTN 102. The obtained services may be, e.g., conventional telephone services or various next generation services that are supported through the use of the ESBD 120 of the present invention. While CP 114 is illustrated as including only a landline phone, it is to be understood that it may have any number of communications devices including, e.g., telephones, faxes, and/or computer devices. In addition, it is to be understood that normally multiple customer premises are coupled to the SSP 126 at any given time and that calls from multiple SSPs 126 will normally be serviced by the SCP 118 at any given time.

Figure 2:
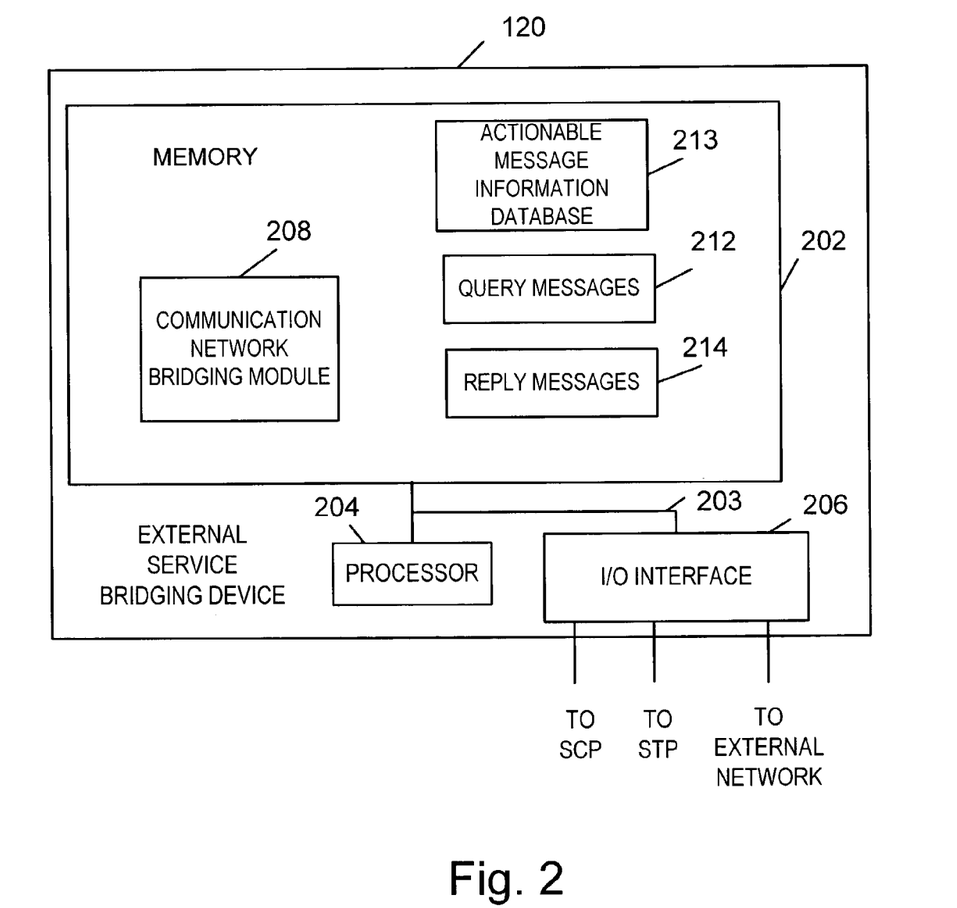
FIG. 2 illustrates an exemplary external service bridging device (ESBD) implemented in accordance with the present invention.

FIG. 2 illustrates an exemplary ESBD 120, implemented in accordance with the present invention. The external service bridging device 120 includes a processor 204, an I/O interface 206 and a memory 202, coupled together by a bus 203. The processor 202 is used to execute the instructions included in module 208 thereby control signal processing in accordance with the invention may be implemented, e.g., using a general purpose CPU. The I/O interface 206 may be implemented using one or more line cards, e.g., with each line card supporting a particular communications protocol and/or line interface.

The memory 206 includes a communication network bridging module 208, and stored information that may be used to implement the steps of the present invention. The communication network bridging module 208 may be implemented as a set of software instructions used to control processing of signals, e.g., SS7 messages, and/or signals from one or more external devices received by the ESB 120. When executed by the processor 204, the communications network bridging module 208 can cause signals received by I/O interface 206 to be monitored, intercepted, duplicated, replaced, broadcast, redirected and/or otherwise processed as necessary or desired. Processing may involve reformatting and/or generating new messages or signals in a format that differs from the original format in which as signal is received. This is particularly useful for supporting passage of messages and/or other information between the PSTN's SS7 network and the additional networks 104, 104' 104" used to coupled the ESBD 120 to the devices 106, 108, 110, 112.

The stored information included in memory 102 includes an actionable TCP message information database 209, information about outstanding actionable TCAP messages 210 which were detected, TCAP messages 212 which were detected and temporarily stored during processing, and reply messages 214 which are stored prior to processing and/or transmission to the SSP 126. Actionable TCP message information database 209 may be implemented as a look-up table listing a TCP message identifiers, e.g., user IDs such as telephone numbers, which can be used to identify actionable TCP messages and also listing the action to be taken for each actionable TCP messages. Different actions may be associated in the database 209 with different TCP message identifiers.

Figure 3:
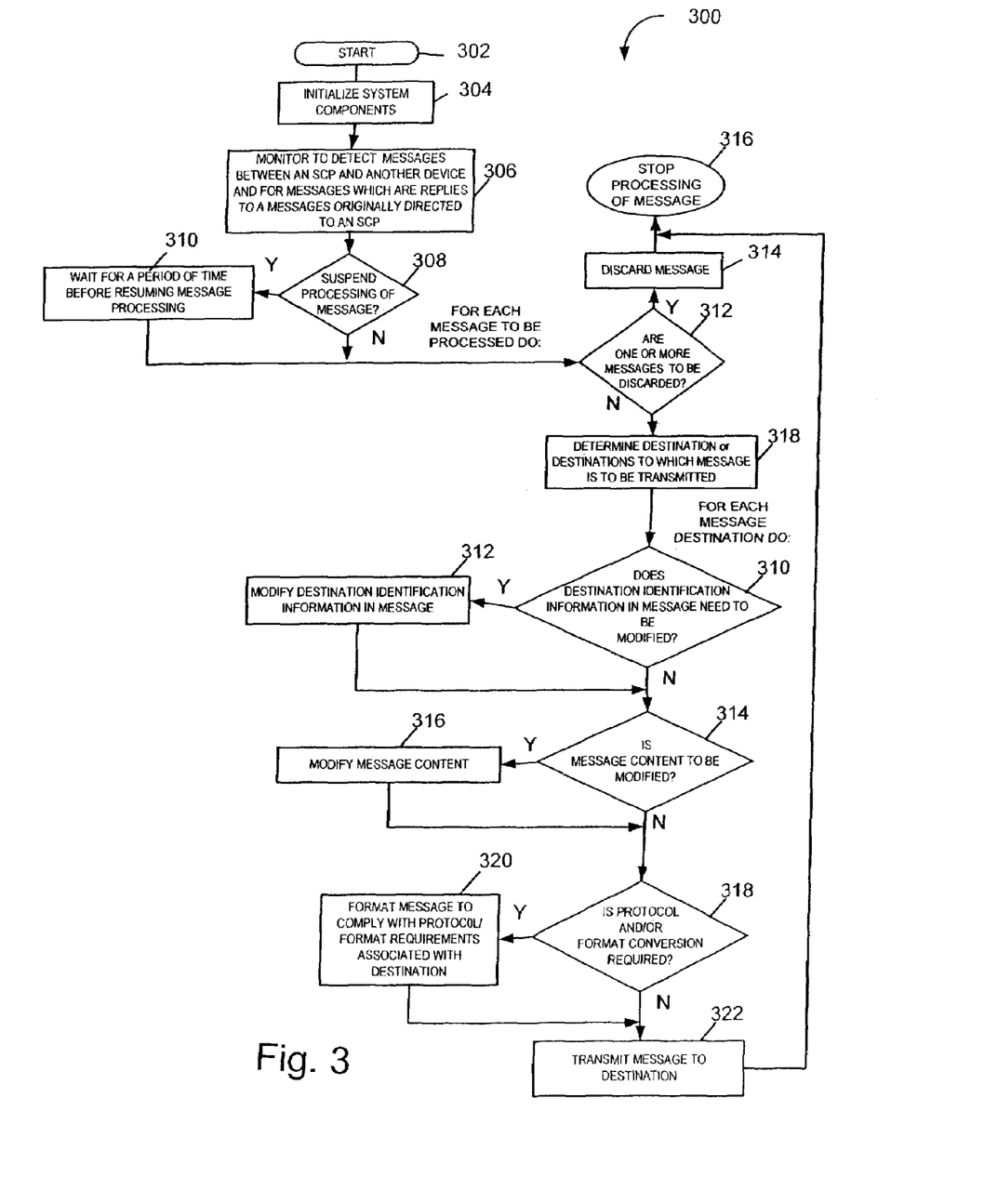
FIG. 3 is a flow chart illustrating the steps of an exemplary method of the present invention which may be implemented by the ESBD of FIG. 2.

FIG. 3 illustrates the steps of an exemplary method 300 for monitoring and processing signals, e.g., TCAP messages, in accordance with the present invention. The method 300 is implemented by the ESBD 120 operating under control of communication network bridging module 208. The method 300 starts in step 302, e.g., with the system components being powered up. Operation proceeds from step 302 to initialization step 304 wherein the ESBD 120 is initialized to provide services to subscribers in accordance with the invention. The initialization process includes, e.g., logging in with external servers to determine their availability and for receiving updates to the contents of the actionable TCAP message information database 209 maintained by the ESBD 120. As part of the update process information on how to process specific TCAP messages and TCP message identifiers, e.g., specific user Ids, telephone number, or portions of telephone numbers used to identify actionable TCAP messages may be stored in the database 209.

As mentioned earlier, the system 100 is implemented using advanced intelligent network (AIN) techniques. Accordingly, as part of initializing the system 100 customer CPRs are generated and AIN triggers, e.g., Originating and/or Termination Attempt Triggers, are set at the SSP 126.

SSP 126 is operated to receive calls on an ongoing basis. As each call is received, the SSP 126 checks to determine if an incoming call activates an AIN trigger. If no trigger is set on the line, e.g., because the called party or the calling party does not subscribe to an AIN or enhanced telephone service, the call is allowed to complete in a normal manner.

However, if it is determined that an AIN trigger is set on the line, call processing is halted at the SSP 126 and a query, e.g., a TCAP message, is sent to the SCP 118 for call processing instructions.

In the exemplary communication system 100 of FIG. 1, the ESBD 120 is positioned so that it can monitor and/or intercept transmissions to and/or from the SCP 118. In addition to SCP 118, an external server or other device 106, 108, 110, 112 may be used to provide enhanced telephone services. In cases where an external device is used, ESBD 120 is used to support interoperability between the external service server and the PSTN. In cases where the external device used to provide the service a SCP, e.g., CLEC SCP 106, this may involve copying and/or redirecting a received TCAP message. In other cases it may involve duplicating, reformatting, and/or broadcasting a received TCAP message.

Following initialization, operation proceeds to step 306 wherein the ESBD 120 monitors for messages between the SCP 118 and another device, e.g., SSP 126. The messages may be directed to, or may be from, the SCP 118. The ESBD 120 also monitors for message that are in response to a message originally directed an SCP 118.

Monitoring for messages, e.g., TCAP messages and/or reply messages from one or more servers, occurs on an ongoing basis in step 306. However, in response to detecting a monitored message, processing of the detected message proceeds to step 308. In decision step 308, the ESBD 120 determines if processing associated with a detected message should be suspended. Request for call processing instructions directed to an SCP are normally not delayed with processing proceeding directly from step 308 to step 312. However, processing of reply messages may be suspended temporarily, e.g. to provide time for multiple replies to be received.

In one embodiment, determining if message processing should be suspended involves determining if the detected message is a reply to a broadcast message sent to multiple devices, e.g., SCP 118 and one or more feature servers 110, 112. Suspending of message processing for a brief period of time after the first reply to a broadcast message is received allows time for other replies corresponding to the same broadcast request message to be received before deciding which reply to forward, e.g., to SSP 126 in response to a TCAP request message seeking call processing instructions. If in step 308 it is determined that message processing is to be suspended, e.g., because the detected message is a reply to a broadcast request message, operation proceeds to step 310 wherein a period of time is allowed to pass before processing of the message is resumed. During this period of time, other reply messages corresponding the same request message may be received. In one embodiment, the time period for suspending processing messages corresponding to a broadcast request message begins running from the time the first reply message is detected. Accordingly, processing of replies corresponding to the same request message may vary with the processing of the reply messages corresponding to the same request resuming at the same time.

Operation proceeds from step 310 to step 312. In step 312 a determination is as to whether one or more messages to be processed should be discarded and which particular messages are to be discarded. In the case of a reply to a broadcast request message this will normally involve selecting all but one reply received in response to a broadcast request message to be discarded. This will normally result in the reply from SCP 118 being discarded in favor of a reply from one of the servers 108, 110, 112 or CLEC SCP 106 being retained for further processing. The ESBD may include a set of rules used for selecting which one of a plurality of replies should be retained and which ones should be discarded. In the case of messages directed to an SCP 118, such messages normally will not be discarded and will pass through steps 308, 312 without unnecessary delay.

Processing of messages to be discarded proceeds from step 312 to step 314 wherein the messages to be discarded are discarded. Processing with regard to the individual messages to be discarded proceeds from step 314 to step 316 wherein processing associated with the individual messages stops.

Processing of messages which are not selected to be discarded, proceeds from step 312 to step 318. These messages will normally include, e.g., messages directed to an SCP requesting call processing instructions and an individual reply message received in response to an earlier request message. In step 318, the ESBD 120 determines the destination or destinations to which the detected message is to be transmitted. In step 318, it may be determined that a message being processed is to be broadcast to multiple destinations. An external server, Intelligent peripheral device or other external device may be consulted for information when making such a decision. For example, a decision on whether or not to forward a detected request message may, in part, be based on information obtained from the customer feature server indicating whether a particular service subscriber has a call processing service provided the by the server 110 activated at a particular point in time. Rather than contact an external device, it is also possible for the ESBD 120 to rely on internal information and/or rules to make a message destination decision. For example, the ESBD 120 may be programmed to route request messages corresponding to particular telephone number to CLEC SCP 106 instead of SCP 118. The ESBD 120 may decide that, in some cases, a received message is to be broadcast to multiple destinations. This feature is particularly useful when a feature server 110, 112 is to provide call processing instructions at some points in time while the SCP 118 serves as the default source of call processing instructions in the event that one of the feature servers 110, 112 does not proved the requested call processing information.

For each message destination identified in step 318, message processing proceeds to step 310. In the case of broadcast messages, this results in step 310 being traversed for each of multiple message destinations. In step 310 a determination is made as to whether message destination information included in the detected message needs to be modified. This determination is made, e.g., on a difference between the determined destination of step 318 and the original destination of the message as indicated, e.g., in a message header field.

Modification of message destination information will be required when the message is being directed to a destination other than its original destination. In the case of redirected messages or messages which are part of a broadcast operation which are directed to a destination other than the original destination, the destination identification information will be changed to reflect the new destination, in step 310 it is determined that the destination identification information needs to be modified and operation proceeds to step 312. In step 312, the destination identification information in the message being processed is modified, e.g., to reflect the new destination, and then message processing proceeds from step 314.

In cases where a message destination matches the original intended destination, the destination identifier included in the message being processed need not be modified and operation will proceed directly from step 310 to step 314.

If in step 314, a determination is made as to whether the message content, which may include one or more header fields, needs to be modified. This determination may be based on information included in the ESBD 120 about processing to be performed for messages corresponding to particular customers and/or services, e.g., as indicated by one or more message header fields. For example, for some enhanced services the message content may be modified so that the message appears to correspond to a different service subscriber.

If in step 314 it is determined that the message content is to be modified, operation proceeds to step 316 wherein a message content modification operation is performed. Operation proceeds from step 316 to step 318. Operation proceeds from step 314 directly to step 314, when it is determined that the message content need not be modified.

In step 318 a determination is made as to whether protocol and/or format conversion is required for the message to be transmitted to the intended destination. In one exemplary embodiment, the ESBD 120 stores information indicating the protocol and/or format requirements associated with each of a variety of possible destinations. Using the indicated message destination, the protocol and/or format requirement information is accessed and compared to the current format and/or protocol associated with the message being processed. If the format and/or protocol required by the destination differs from that of the message, protocol and/or format conversion is required and operation will proceeds from step 318 to step 320.

In cases where the message was originally directed to the SCP 118 and has been redirected or broadcast to a server or other IP based device, both protocol and/or format conversion will normally be required. In cases of simply redirecting a message to another device of the same type, e.g., CLEC SCP 106 instead of SCP 118, over the same type of network, protocol and/or format conversion are normally not necessary. Reply messages from a server 110, 112 transmitted over an IP network to an SSP 126 will normally require both format and protocol conversion.

In step 320 the message is formatted to comply with the protocol and/or format requirements associated with the message's destination. Operation then proceeds to step 322. If in step 318 it is determined that protocol and/or format conversion is not required, operation proceeds directly to step 322.

In step 322, the processed message is transmitted to its intended destination. From step 322 operation proceeds to step 316 wherein processing associated with the individual message, e.g., the message transmitted in step 322, stops.

In accordance with the method illustrated in FIG. 3, messages on a SS7 communications link, e.g., query messages for call processing instructions directed to an SCP, can be detected and processed. Processing may allow the message to pass to its original destination unaltered, to redirect the detected message to another destination, to broadcast the message to various servers and/OR SCPs as an alternative to transmitting the message to an SCP to which it was originally directed or, to broadcast the message to one or more devices in addition to transmitting the message to an SCP to which it was originally directed. In the case of detected messages which are replies to a query message originally directed to an SCP, message processing may be suspended temporarily to provide time to receive any additional replies that may correspond to a query message that was broadcast. Normally, in the case where multiple reply messages are received only one will be forwarded to the ultimate destination, e.g., the telephone switch 126 to which the replies are directed. Assuming a reply from a server and not an SCP is selected to be forwarded to the SSP 126 it will normally be reformatted to appear as if it came from the SCP 118 to which the original query for call processing instructions was sent. Since the reply message appears to the SSP 126 as though it were from the SCP 118 as expected, the method of the present invention provides a convenient and relatively transparent manner by which devices other than a conventional SCP, or an alternative SCP, can be used to control call routing functions and the provision of telephone services. Significantly, this can be done without requiring hardware modifications to existing SCPs 118 or switches in the PSTN 102.

Using the above described methods and apparatus, services that run on or require the use of external servers, which may use different communication protocols than the SS7 protocol used by the PSTN 102, can be integrated with the PSTN. In addition, the methods and apparatus of the present invention can add functionality to the existing PSTN without requiring modifications to existing SSPs 126 or SCPs 118.

The steps of the various methods of the invention discussed above may be implemented in a variety of ways, e.g., using software, hardware or a combination of software and hardware to perform each individual step or combination of steps discussed. Various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps or signal processing operations discussed above.

Although the above descriptions relate primarily to SS7 TCAP messages, which are used for service control, the present invention can also be applied to the call routing portion of an SS7 network, i.e., SS7 ISUP messages that route between end offices. Query messages in the context of the present application are to be interpreted broadly as information, messages or other signals to which a response including call processing instructions or other call handling information is expected in reply.

It is to be understood that numerous variations on the above described methods and apparatus are possible without departing from the scope of the invention and that a wide range of applications are possible. For example, the present invention can be used to offload Global Title Translation (GTT) functionality from STPs. This reduces the requirement for multiple Translation Types (a limited resource) needed in the SS7 to accommodate alternative Service Control platforms, e.g., for CLEC SCP access, Customer Feature Server.

Other services include routing AIN/TCAP queries to non-SS7 SCP's; receiving service requests from external entities, e.g., with IP feature servers, a TCAP query is formulated and sent to an SCP, and the reply is intercepted, formatted and sent to the originating feature server; implementing Web services protocols, e.g. SOAP, XML, to make service logic on the Internet available to PSTN services, or service logic within the PSTN/SS7 network available to external services; incorporating SIP proxy function; incorporating signaling gateway function, e.g., to/from IP network; and incorporating SS7 firewall and gateway screening functions.

The above examples and embodiments are exemplary. Numerous variations on the above described methods and apparatus are possible while still remaining within the scope of the present invention.

What is claimed is:

1. A method of providing enhanced telephone network capabilities, the method comprising:
   operating a device including a processor for monitoring a communications link to detect query messages directed to a service control point;
   in response to detecting a query message to the service control point, determining if said detected query message is to be transmitted to another control device; and
   transmitting said detected query message to said another control device.

2. The method of claim 1, wherein transmitting at least one detected query message to said another control device includes:
   transmitting said at least one detected query message to another service control point.

3. The method of claim 1, wherein transmitting at least one detected query message to said another control device includes:
   transmitting said at least one detected query message to multiple control devices.

4. The method of claim 3, wherein transmitting said at least one detected query message to multiple control devices includes transmitting said at least one message to said service control point in addition to at least one other control device.

5. The method of claim 1, further comprising:
   monitoring said communications link to detect a reply to a message originally directed to the service control point; and
   reformatting at least one detected reply from a device other than the service control point to make it appear like a reply from said service control point.

6. A method of providing enhanced telephone network capabilities, the method comprising:
   operating a device including a processor for monitoring a communications link to detect query messages directed to a service control point;
   in response to detecting a query message to the service control point, determining if said detected query message is to be transmitted to another control device;
   transmitting said detected query message to said another control device; and
   reformatting said detected query message prior to transmitting it to said another control device.

7. The method of claim 6, wherein said another control device is an IP based server.

8. The method of claim 7, wherein said reformatting includes converting said at least one detected query message from an SS7 format to an IP format.

9. A method of providing enhanced telephone network capabilities, the method comprising:
   monitoring a communications link to detect query messages directed to a service control point;
   in response to detecting a query message to the service control point, determining if said detected query message is to be transmitted to another control device;
   transmitting said detected query message to said another control device,
   monitoring said communications link to detect a reply to a message originally directed to the service control point;
   reformatting at least one detected reply from a device other than the service control point to make it appear like a reply from said service control point; and
   temporarily suspending processing of at least one detected reply to a broadcast message.

10. The method of claim 9, further comprising:
    discarding all but one detected reply to said broadcast message.

11. The method of claim 10, wherein discarding all but one detected reply to said broadcast message includes discarding a reply received from said service control point.

12. A method of providing a communications service, comprising:
    operating a device including a processor for monitoring a communications link coupled to a first device to detect replies to a broadcast message directed to multiple devices, including a service control point;
    in response to detecting a first reply to said broadcast message, temporarily suspending processing of said first reply; and
    resuming said processing of said first reply.

13. The method of claim 12, wherein resuming processing of said first reply includes:
    forwarding said first reply to said first device in the absence of receiving any other replies to said broadcast message prior to resuming processing of said first reply.

14. The method of claim 12, further comprising:
    receiving at least one additional reply to said broadcast message before resuming processing of said first reply; and
    discarding all but one of the replies to said broadcast message.

15. The method of claim 14,
    wherein at least one of the received replies to said broadcast message is from said service control point; and
    wherein the step of discarding all but one of the replies includes discarding the reply from said service control point.

16. The method of claim 15, further comprising the step of:
    reformatting the one of the replies which is not discarded to appear as though it is from said service control point; and
    forwarding said reformatted reply to said first device.

17. A method of providing a communications service, the method comprising:
    operating a device including a processor for monitoring an SS7 communications link to detect messages of at least one of a first type and a second type, the first type of message being a message directed to a service control point, the second type of message being a reply to the message of the first type;
    modifying the content of one said detected message of the first message type; and
    forwarding the modified message to the service control point.

18. The method of claim 17, further comprising:
    transmitting a reply to the modified query message received from the service control point to a signal switching point from which said at least one detected message originated.

19. A method of providing a communication service, the method comprising:
    operating a device including a processor for monitoring a communications link between a telephone switch and a first service control point to detect a query message seeking call processing information from the first service control point; and
    in response to detecting said query message, performing a query message multicast operation.

20. The method of claim 19, wherein the query message multicast operation includes transmitting said query message to at least one control device in addition to said service control point.

21. The method of claim 20, wherein said at least one control device is an IP server, said step of transmitting said query message to said IP server including converting said query message from an SS7 format to an IP format.

22. The method of claim 21, further comprising:
receiving multiple replies in response to said multicast query message; and
selecting one of said replies to be returned to said telephone switch.

23. The method of claim 22, further comprising:
formatting the selected one of said replies so that the reply is in the same format as a reply from the service control point.

24. A method of providing a communication service, the method comprising:
operating a device including a processor for monitoring a communications link between a telephone switch and a first service control point to detect a query message seeking call processing information from the first service control point; and
in response to detecting said query message, performing a query message multicast operation including transmitting said query message to at least one control device in addition to said service control point;
wherein said at least one control device is an IP server, said step of transmitting said query message to said IP server including converting said query message from an SS7 format to an IP format;
receiving multiple replies in response to said multicast query message;
selecting one of said replies to be returned to said telephone switch;
formatting the selected one of said replies so that the reply is in the same format as a reply from the service control point; and
wherein the multiple replies includes a reply from the service control point, said selected reply being from a device other than said service control point, the method further comprising:
preventing the reply received from the service control point from being transmitted to said telephone switch.

* * * * *